United States Patent [19]

Last

[11] 4,141,830
[45] Feb. 27, 1979

[54] OZONE/ULTRAVIOLET WATER PURIFIER

[75] Inventor: Anthony J. Last, Oakville, Canada

[73] Assignee: Ontario Research Foundation, Mississauga, Canada

[21] Appl. No.: 874,144

[22] Filed: Feb. 1, 1978

[30] Foreign Application Priority Data

Feb. 2, 1977 [GB] United Kingdom ............... 4331/77

[51] Int. Cl.² .......................... C02B 1/38; C02B 3/00
[52] U.S. Cl. .................................. 210/63 Z; 210/64;
210/192; 422/24; 250/533
[58] Field of Search ............... 210/63 Z, 64, 192, 205;
21/54 R, 102 R, DIG. 2

[56] References Cited

U.S. PATENT DOCUMENTS

| | | | |
|---|---|---|---|
| 3,336,099 | 8/1967 | Czulak et al. | 210/63 Z |
| 3,550,782 | 12/1970 | Veloz | 210/192 |
| 3,659,096 | 4/1972 | Kompanek | 210/64 X |
| 3,843,521 | 10/1974 | Zeff | 210/192 X |

Primary Examiner—Thomas G. Wyse
Attorney, Agent, or Firm—Sim & McBurney

[57] ABSTRACT

There is provided an apparatus for purifying liquid such as water, in which an ultraviolet light source irradiates air passing through a first chamber surrounding the source, and then irradiates the liquid passing through the second chamber surrounding the first chamber. The air from the first chamber is ozonated by the U.V. light, and this air is bubbled into the water in the second chamber to maximize the purification through simultaneous ultraviolet and ozone exposure.

11 Claims, 3 Drawing Figures

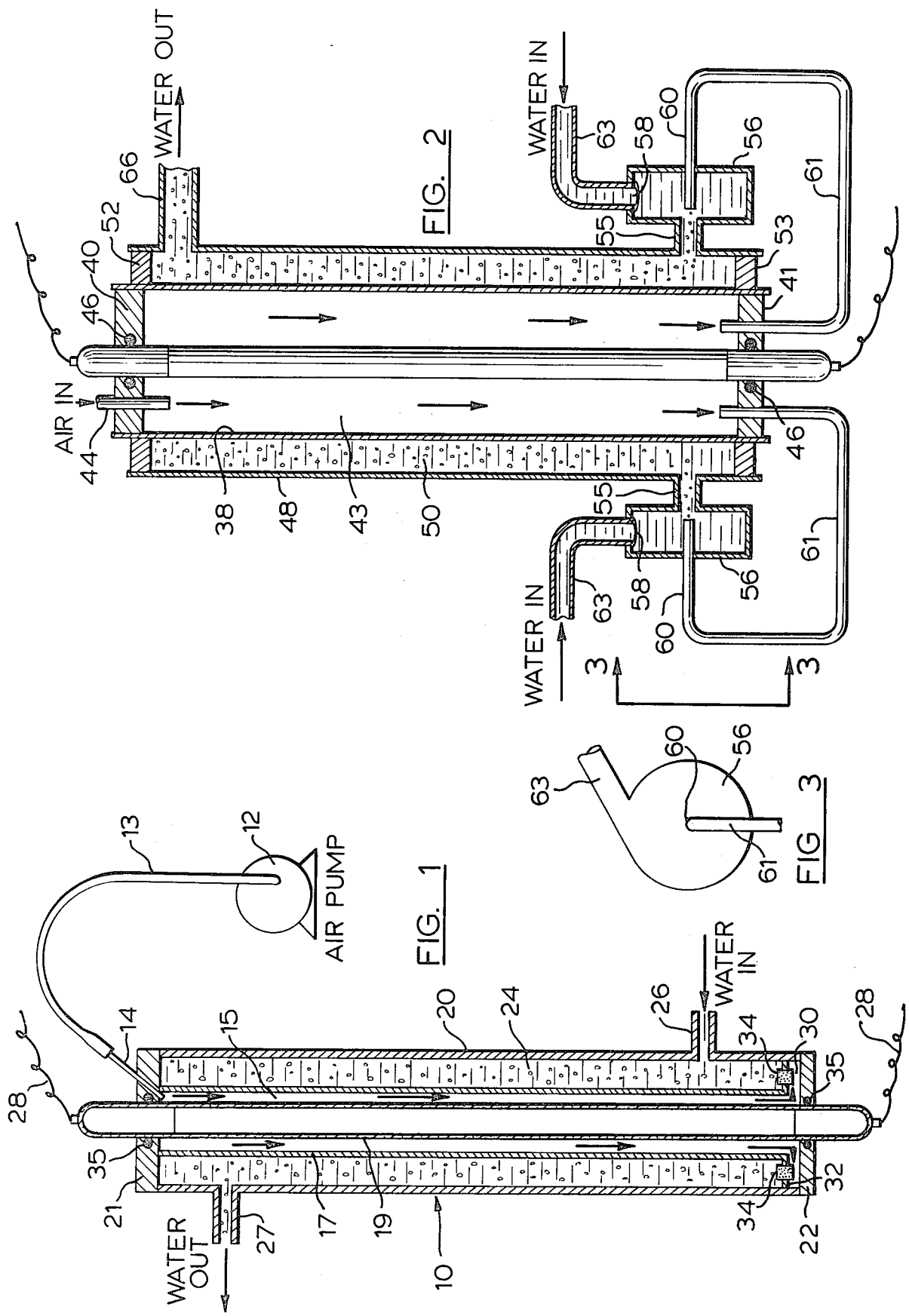

OZONE/ULTRAVIOLET WATER PURIFIER

This invention relates generally to purifiers for liquid, particularly for water, and has to do especially with a water purifier which utilizes both ozone and ultraviolet radiation for purifying purposes.

BACKGROUND OF THE INVENTION

The prior art includes both ozone portable water purifiers and ultraviolet water purifiers. It is also known to subject contaminated water to both ozone treatment and ultraviolet radiation treatment, although this is normally carried on at separate locations or sequentially with respect to time. The standard method of making ozone is very expensive which renders this technique too costly for simple home and cottage water purifiers.

DESCRIPTION OF THE INVENTION

The present invention takes advantage of the fact that small amounts of ozone can be produced by an ultraviolet lamp which is simultaneously irradiating the water, and this small quantity of ozone is combined in the flowing water while the latter is being irradiated. This will place some residual ozone in the water for maintaining disinfection downstream of the irradiation location, and will allow simultaneous disinfection with ozone and with ultraviolet.

Accordingly, this invention provides an apparatus for treating a liquid, comprising:
an ultraviolet light source,
first means defining a first chamber surrounding said source and allowing ultraviolet light to pass through said chamber,
second means defining a second chamber surrounding said first chamber and allowing ultraviolet light to pass through said second chamber,
inlet and output means on said second chamber to allow said input liquid to enter and leave said chamber, and
third means for causing air to enter said first chamber and traverse the same while being irradiated with ultraviolet light to generate ozone, and to mix the ozonated air with the liquid in the second chamber while the latter is being irradiated with ultraviolet light.

This invention further provides a method of purifying a liquid, comprising the steps:
passing air through a first chamber surrounding a source of ultraviolet light, to allow said light to convert some of the oxygen in the air to ozone,
passing said liquid through a second chamber surrounding said first chamber, the second chamber also being irradiated by said source simultaneously with said first chamber, and
passing the air from said first chamber into the liquid in the second chamber to allow mixing of the air with the liquid in the second chamber.

GENERAL DESCRIPTION OF THE DRAWINGS

Two embodiments of this invention are illustrated in the accompanying drawings, in which like numerals denote like parts throughout the several views, and in which:

FIG. 1 is a vertical sectional view through a first embodiment of the invention;

FIG. 2 is a sectional view through a second embodiment of this invention; and

FIG. 3 is an elevated view of a component of the FIG. 2 apparatus, seen from the line 3—3 in FIG. 2.

In FIG. 1, the numeral 10 designates an ultraviolet water purifier, and a small air pump is designated by the numeral 12. The pump 12 is adapted to pump air along an air supply line 13 through an entry tube 14 and into an annular elongated space 15 between a quartz tube 17 and an ultraviolet lamp 19 which is coaxial with the tube 17. Preferably, the flow of air along the annulus 15 from the pump 12 is not great enough to overly cool the lamp 19.

An outside cylindrical jacket 20, an annular top piece 21, and an annular bottom piece 22 define with the quartz tube 17 a further elongated annular space 24 through which contaminated water passes from an inlet 26 to an outlet 27. Electrical wires 28 are shown for the lamp 19.

The means for allowing the air passing through the annular space 15 to enter and be mixed with the liquid in the chamber 24 is shown at the bottom of the apparatus in FIG. 1. As can be seen, the annular space 15 communicates at the bottom with an outwardly flared region 30 defined between the bottom annular piece 22 and a partition 32. Located in the partition are rigid porous blocks 34 of sintered glass or stainless steel. The pressure maintained in the annular space 15 by the air pump 12 is just great enough to overcome the back pressure agains the porous blocks 34, so that the air can pass through the blocks and bubble upwardly through the water in the chamber 24. O-rings 35 are provided for sealing against the lamp.

As the air flows down the annular space 15, minute quantities of the oxygen in the air are converted to ozone due to the effect of the ultraviolet radiation, and the ozone tends to dissolve in the flowing water within chamber 24 after the mixing has taken place. An additional advantage of the apparatus shown in FIG. 1 relates to the turbulence caused by the bubbles, as this will have a tendency to ensure consistent irradiation of the entire flow by the ultraviolet radiation from the lamp 19.

Attention is now directed to FIGS. 2 and 3, which show the second embodiment of this invention. In these figures, an ultraviolet lamp 36 is oriented vertically (as is the case with the first embodiment) and is located axially with respect to a surrounding cylindrical quartz tube 38. Annular members 40 and 41 at the top and bottom, respectively, of the apparatus of FIG. 2 extend between the quartz tube 38 and the lamp 36, thereby defining an air chamber 43. A tube 44 is provided through the upper annular member 40 to allow air to be aspirated into the chamber 43 from the ambience. O-ring seals 46 are provided between the lamp 36 and the members 40 and 41.

Concentrically surrounding the quartz tube 38 is a cylindrical jacket 48, which defines with the quartz tube an annular chamber 50 for contaminated liquid, such as water. The upper and lower ends of the chamber 50 are closed by annular members 52 and 53, respectively.

Toward the lower end of the apparatus shown in FIG. 2, the annular chamber 50 communicates through piping 55 with the outlets of two vortex chambers 56, each being of circular section and each having a tangential inlet 58 for the contaminated water, and a coaxial inlet 60 for air. The two inlets 60 are in communication along tubes 61 with the bottom end of the chamber 43, through passages through the annular member 41. Pipes 63 are connected to the tangential inlets 58 and are adapted to receive contaminated water under pressure.

The operation of vortex chambers such as those shown at 56 is well known. The water under pressure enters the center cavity of the vortex chamber tangentially and causes the water in the chamber to spin rapidly while approaching the center axis. When close to the center axis, the water adds an axial component to its motion and exits through the outlet 55. Because of the rapid rotation toward the center, the pressure is lowered, and by suitably selecting dimensions and flow parameters it is possible to create a vacuum with respect to atmospheric pressure along the axis of the vortex chamber. It is intended that such a vacuum be created in the vortex chambers 56 utilized with this invention, whereupon air is drawn out of the annular chamber 43 and into the vortex chamber 56. Replacement air is simultaneously drawn from the ambience through the tube 44. In the pipes 55, the air from the annular chamber 43, which has been ozonated to some extent by the effect of the ultraviolet light from the lamp 36, is thoroughly mixed with the contaminated water, and this mixture then passes into the annular chamber 50 at the bottom thereof, moves upwardly therealong to be irradiated by the ultraviolet light from the lamp 36, and then passes outwardly along an outlet 66 at the top of the chamber 50, opening through the cylindrical jacket 48.

In a variation of the invention not illustrated, it is contemplated that the vortex chambers could be replaced with a venturi arrangement in order to achieve the aspiration of air from the interior chamber next to the lamp. The use of the vortex chambers as illustrated in FIG. 2 is likely, however, to produce a greater degree of turbulence in the contaminated water, thus being capable of breaking up clumps of bacteria for more efficient irradiation by the ultraviolet lamp.

Is is thus seen that there has been provided a method of purifying a liquid such as water, the essential focus of which is the use of ultraviolet radiation from a single lamp to firstly ozonate air passing down a first chamber surrounding the ultraviolet light source, and then to pass the ozonated air into the contaminated liquid to allow mixing between them while the liquid is passing along a second chamber surrounding the first chamber, the second chamber also being irradiated by the same source of light simultaneously with the first chamber, such that the contaminated water receives simultaneously the benefit of the ozone and the benefit of the direct radiation from the ultraviolet light source.

In the preferred embodiment the lamp is an elongated one and the chambers are also elongated with the entire apparatus being oriented vertically.

It is considered that there will be present a synergistic effect between the ozonation of the water and the ultraviolet irradiation of the same, when these are done simultaneously. It is expected that the oxidation of organics by ultraviolet light in one container and then the use of ozone in another container separated in time will not be as great as the use of the two effects simultaneously in the same chamber.

What I claim is:

1. Apparatus for treating a liquid, comprising:
    an ultraviolet light source,
    first means defining a first chamber surrounding said source and allowing ultraviolet light to pass through said chamber,
    second means defining a second chamber surrounding said first chamber and allowing ultraviolet light to pass through said second chamber,
    inlet and outlet means on said second chamber to allow said liquid to enter and leave said chamber, and
    third means for causing air to enter said first chamber and traverse the same while being irradiated with ultraviolet light to generate ozone, and to mix the ozonated air with the liquid in the second chamber while the latter is being irradiated with ultraviolet light.

2. The apparatus claimed in claim 1, in which said third means includes an air pump upstream of said first chamber, and gas diffuser means downstream of the first chamber, the gas diffuser means communicating with said second chamber at a lower region thereof and allowing ozonated air to be released into said second chamber.

3. The apparatus claimed in claim 2, in which the source is an elongated tube oriented vertically, the said chambers being concentric with said tube and also vertically oriented, an inlet at the top of the first chamber for pressurized air from the pump, the first chamber including at the bottom an outwardly flared region underlying the second chamber, the diffuser means being located in a partition separating the second chamber from said outwardly flared region.

4. The apparatus claimed in claim 2, in which the diffuser means is a porous rigid block.

5. The invention claimed in claim 1, in which said third means includes at least one vortex chamber of circular section having a tangential inlet for liquid, a coaxial outlet for liquid and a coaxial inlet for air, the coaxial inlet for air being connected to the first chamber, the first chamber being open to the ambience, the tangential inlet being adapted to receive said liquid under pressure, the coaxial outlet being piped into said second chamber at said inlet means thereof.

6. The invention claimed in claim 5, in which the source is an elongated tube oriented vertically, the said chambers being concentric with said tube and also vertically oriented, the first chamber being open to the ambience at the top thereof, the said coaxial inlet for air being connected to the first chamber at the bottom thereof.

7. The invention claimed in claim 6, in which there are two vortex chambers, both having their coaxial outlets piped into the second chamber at the bottom thereof.

8. A method of purifying a liquid, comprising the steps:
    passing air through a first chamber surrounding a source of ultraviolet light, to allow said light to convert some of the oxygen in the air to ozone,
    passing said liquid through a second chamber surrounding said first chamber, the second chamber also being irradiated by said source simultaneously with said first chamber, and
    passing the air from said first chamber into the liquid in the second chamber to allow mixing of the air with the liquid in the second chamber.

9. The method claimed in claim 8, in which both chambers are vertically elongated, and in which the liquid is passed in the upward direction through the second chamber, the air being passed into the second chamber at the bottom thereof.

10. The method claimed in claim 9, in which the air is passed into the second chamber by bubbling it through a porous block in a wall separating the two chambers.

11. The method claim in claim 9 in which the air traverses the first chamber in the downward direction, and is drawn out of the first chamber by being aspirated into an axial inlet of a vortex chamber of circular section having a tangential inlet into which said liquid is pumped under pressure and a coaxial outlet which is piped to said second chamber at the bottom thereof.

* * * * *